United States Patent
Chen et al.

(10) Patent No.: US 10,650,578 B2
(45) Date of Patent: May 12, 2020

(54) DYNAMIC SOFT SHADOW

(71) Applicant: Microsoft Technology Licensing, LLC, Redmond, WA (US)

(72) Inventors: Tong Chen, Bellevue, WA (US); Jonathan Perron, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/057,745

(22) Filed: Aug. 7, 2018

(65) Prior Publication Data

US 2019/0347849 A1 Nov. 14, 2019

Related U.S. Application Data

(60) Provisional application No. 62/670,687, filed on May 11, 2018.

(51) Int. Cl.
*G06T 15/00* (2011.01)
*G06T 15/60* (2006.01)
*G06T 15/80* (2011.01)

(52) U.S. Cl.
CPC .............. *G06T 15/60* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 7,508,390 B1 | 3/2009 | Demers | |
| 7,936,944 B2 | 5/2011 | Sato et al. | |
| 9,576,393 B1 | 2/2017 | Bethel | |
| 10,084,996 B1* | 9/2018 | Varadarajan | H04N 9/3155 |
| 10,365,813 B2* | 7/2019 | Swindell | G06F 3/04847 |
| 2003/0058241 A1 | 3/2003 | Hsu | |
| 2004/0145603 A1* | 7/2004 | Soares | G06F 16/40 |
| | | | 715/730 |
| 2005/0134588 A1* | 6/2005 | Aila | G06T 15/60 |
| | | | 345/426 |

(Continued)

FOREIGN PATENT DOCUMENTS

| | | |
|---|---|---|
| CN | 102768765 B | 7/2015 |
| WO | 2018076038 A1 | 5/2018 |

OTHER PUBLICATIONS

Ren, et al., "Real-time Soft Shadows in Dynamic Scenes using Spherical Harmonic Exponentiation", In Journal of ACM Transactions on Graphics, vol. 25, Issue 3, Jul. 30, 2006, 10 Pages.

(Continued)

*Primary Examiner* — Martin Mushambo

(57) ABSTRACT

Dynamic soft shadows may be generated without resorting to computationally-expensive multiple render passes and sampling, or lightmap generation. With disclosed systems and methods, a dynamic soft shadow may be rendered in a single pass, which is sufficiently efficient to run on an untethered virtual reality (VR) device, such as a head mounted device (HMD). Despite the efficiency, the shadow quality may be markedly superior to those generated with other methods. In some embodiments, a script may be used with a shader to render a shadow having a realistic size, shape, position, fading factor and sharpness, based on a position and size of a shadow casting element and a light vector.

20 Claims, 8 Drawing Sheets

(56) References Cited

U.S. PATENT DOCUMENTS

2007/0030515 A1* 2/2007 Adachi ............... G06F 21/6209
                                                          358/1.15
2007/0115283 A1* 5/2007 Foster .................... G06T 15/60
                                                          345/426
2015/0262409 A1   9/2015 Morgan et al.
2016/0260245 A1   9/2016 Decell et al.

OTHER PUBLICATIONS

Hasenfratz, et al., "A Survey of Real-Time Soft Shadows Algorithms", In Journal of Computer Graphics Forum, vol. 22, Issue 4, Dec. 1, 2003, pp. 753-774.

"International Search Report and Written Opinion Issued in PCT Application No. PCT/US19/030510", dated Jun. 18, 2019, 12 Pages.

* cited by examiner

DYNAMIC SOFT SHADOW

CROSS-REFERENCE TO RELATED APPLICATION

This nonprovisional application claims the benefit of and priority to U.S. Provisional Application No. 62/670,687, filed May 11, 2018, which is incorporated by reference herein in its entirety.

BACKGROUND

Creating a sufficiently realistic three-dimensional (3D) effect on a display element in a user interface (UI) typically requires casting a shadow. As the object casting the shadow moves, the shadow must be rendered with properly corresponding changes, in order to preserve the 3D realism. Unfortunately, creating a soft shadow in real-time using conventional techniques may be computationally expensive, and thus may be impractical on untethered, mixed reality (MR) or virtual reality (VR) devices (collectively "VR devices") that have limited processing power.

A soft shadow effect is typically achieved with real-time lighting simulation, requiring multiple rendering passes and samplings in a shader. Image quality may be relatively low due to coarse resolution of shadow maps. Because higher processing power may consume more power and generate additional heat, rendering realistic shadowing in every frame in real-time has thus not been attainable on VR devices such as untethered head mounted displays (HMDs) with strict thermal requirements.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

A first aspect is directed to generating dynamic soft shadows without resorting to computationally-expensive multiple render passes and sampling, or lightmap generation. A dynamic soft shadow is rendered in a single pass, which is sufficiently efficient to run on an untethered virtual reality (VR) device, e.g., a head mounted device (HMD). In some embodiments, a script is used with a shader to render a shadow having a realistic size, shape, position, fading factor and sharpness, based on a position and size of a shadow casting element and a light vector. The shadow quality generated by the embodiments disclosed herein is markedly superior to traditional shadow-generating techniques.

A second aspect is directed to rendering a dynamic soft shadow. To do so, a position and size of a shadow casting element is obtained. A light vector direction is also obtained. Based on the distance between the shadow casting element and a shadowed element, a relative direction between the shadow casting element and the shadowed element, and the direction of the light vector, a shadow position, shadow size, and shadow fading are determined based on the distance between the shadow casting element and a shadowed element, a relative direction between the shadow casting element and the shadowed element, and the direction of the light vector. The shadow position, shadow size, and shadow fading may then be used to render a shadow for the shadow casting element on the shadowed element.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1A:
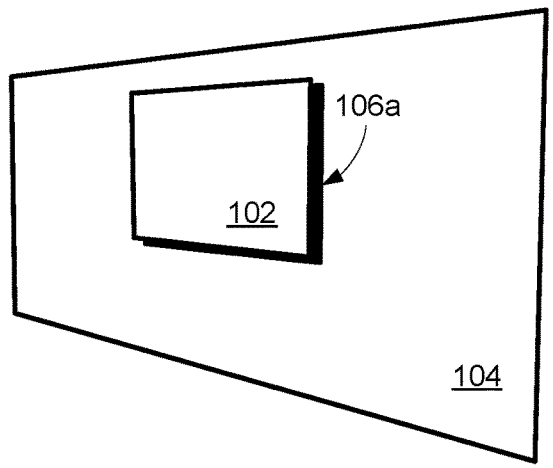
FIGS. 1A-1E are diagrams of a shadowing element casting a shadow on a shadowed element under various geometries, illustrating a changing of a dynamic soft shadow.

The various embodiments will be described in detail with reference to the accompanying drawings. The same reference numbers may be used throughout the drawings to refer to the same or like parts. References made throughout this disclosure relating to specific examples and implementations are provided solely for illustrative purposes but, unless indicated to the contrary, are not meant to limit all examples.

Casting a dynamic soft shadow on user interface (UI) elements can help enhance realism and improve the experience of user interaction in simulated three-dimensional (3D) environments. However, creating soft shadows in real time has previously been challenging on mobile mixed reality (MR) or virtual reality (VR) devices (collectively "VR devices"), particularly head mounted devices (HMDs). The conventional process uses multiple rendering passes and assembles them in order to create a blurred shadow. It may also rely on the resolution of the texture, possibly resulting in lower image quality, due to limited resolution. A typical prior art procedure may include: render an image using a light vector; render onto a texture; load the texture and test whether a particular pixel falls within the shadow area; render an image with a shadow (a hard shadow); to obtain a soft shadow (with blurred edges), multiple passes of edge illumination rendering is required; and then the final rendering is performed. The processing power required to operate such a process in real-time may exceed the thermal limits of HMDs, since faster processing typically consumes more power and generates more heat.

The disclosed components and techniques render a dynamic shadow in a single pass, requiring less processing than conventional methods. This permits effective soft-shadow generation on untethered VR devices, including HMDs with sensitive thermic limits that might otherwise be exceeded with more demanding processing. The dynamic soft shadows generated using the techniques and components disclosed herein may dynamically change in real time after being initially created, requiring far less computing resources to keep the 3D effect realistic because resource-expensive multiple passes and samplings or lightmap generation are no longer needed. The shadows may thus move in real-time as the shadow casting element and/or light vector move. Additionally, the shadow quality generated by the disclosed techniques may be comparable or even superior to those generated with prior processes.

Dynamic soft shadows may be generated without resorting to computationally-expensive multiple render passes and sampling, or lightmap generation. With disclosed systems and methods, a dynamic soft shadow may be rendered in a single pass, which is sufficiently efficient to run on an untethered virtual reality (VR) device, such as a head mounted device (HMD). Despite the efficiency, the shadow quality may be markedly superior to those generated with other methods. In some embodiments, a script may be used with a shader to render a shadow having a realistic size, shape, position, fading factor and sharpness, based on a position and size of a shadow casting element and a light vector.

Embodiments disclosed herein may generate shadows cast by and onto different UI elements. For purposes of this disclosure, the term "UI element" refers to particular object that is visually displayed in a rendered scene. The object may be a rectangular quad, a triangle, a circle, or any other primitive shape, and include a button or an image.

Dynamic shadows may be generated by first determining values for the position and size of a shadow casting (caster) element, and also holding values for the shadow fading factor, as well as the position and the size of the enlarged shadow that includes its blurred edges (soft part). These holding values may also be modified by a light direction vector, relative distance between the caster element and a shadowed (receiver) element. A smoothstep function may then be applied to test positions of pixels against the modified holding values. A shadow is rendered based, at least in part, on the pixel data test. And a script is attached to the receiver element that passes the position and/or size of the caster element to a shader for dynamic updating of the rendered shadow. The script includes particular variables (caster(location) and caster(size)) that are directly tied to the location and size of the caster element. Vertex and fragments shaders use these variables to initially draw a soft shadow and adjust it as the caster moves. Once the receiving element has size and position information, the position of the shadow can be calculated.

Figure 1B:
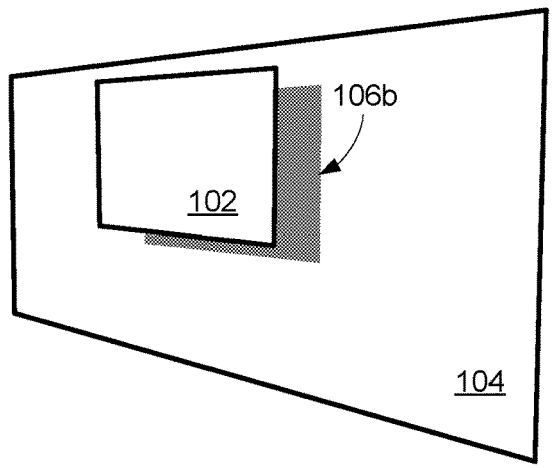
Figure 1C:
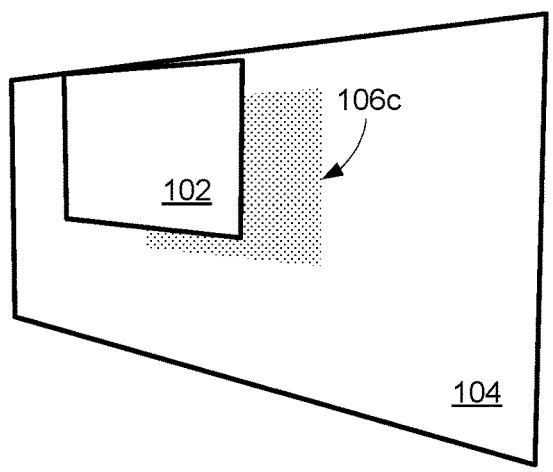

FIGS. 1A-1E are diagrams of a shadowing element casting a shadow on a shadowed element under various geometries, illustrating a changing of a dynamic soft shadow. In FIG. 1A, a shadow casting element 102 is in front of a shadowed element 104, and thus casts a shadow 106a. In FIG. 1A, however, shadow casting element 102 is fairly close to shadowed element 104, so shadow 106a is relatively sharp and dark. In FIG. 1B, shadow casting element 102 has moved further away from shadowed element 104, so shadow 106b is a bit blurred and not quite as dark. In FIG. 1C, shadow casting element 102 has moved even further away from shadowed element 104, so shadow 106c is more blurred and noticeably less dark. In general, as shadow casting element 102 moves an increasing distance from shadowed element 104, the resulting shadow will grow in size, have increasing blur (fuzzier edges), and fade (become more faint). Conversely, as shadow casting element 102 moves closer to shadowed element 104, the resulting shadow will shrink in size, have sharper edges, and become darker. This behavior, linking the distance between shadow casting element 102 and shadowed element 104 with shadow size, shadow fading, and shadow sharpness, tracks the noticeable phenomena of real-world shadows to increase realism.

Figure 1D:
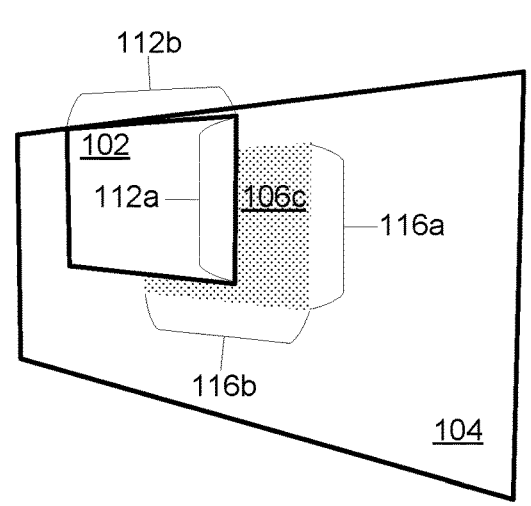
Figure 1E:
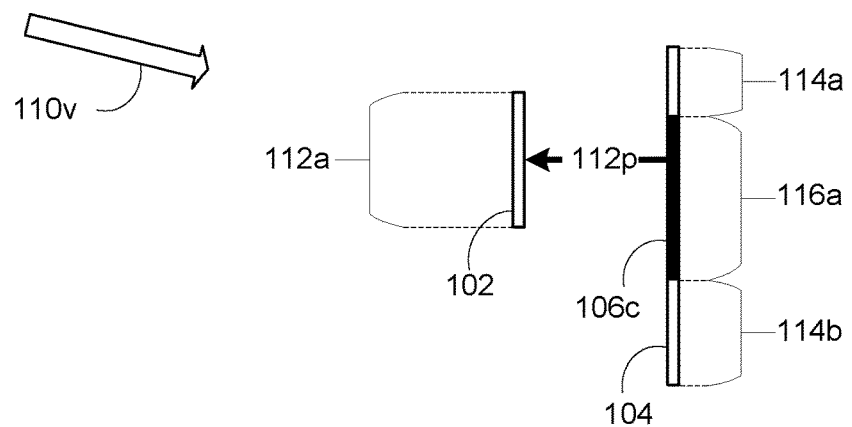

FIG. 1D illustrates determination of some dimensions and sizes. Shadow casting element 102 has a size given by vertical dimension 112a and horizontal dimension 112b. Shadow 106c has a size given by vertical dimension 116a and horizontal dimension 116b. FIG. 1E illustrates determination of some position, distance, and direction information. Shadow casting element 102 is at a position given by a position vector 112p, which may be specified in global coordinates, or may be a relative position, specified as a distance and a direction relative to shadowed element 104. If position vector 112p is a relative position, relative to shadowed element 104, it includes the distance between shadow casting element 102 and shadowed element 104 and also the relative direction (along that distance) between shadow casting element 102 and shadowed element 104. Otherwise, based at least on the position of shadow casting element 102, given by position vector 112p, and the position of shadowed element 104, simple geometric calculations may be used to determine the distance between shadow casting element 102 and shadowed element 104 and also the relative direction between shadow casting element 102 and shadowed element 104 along that distance.

A light vector 110v is also shown, having a particular direction. Although FIG. 1E is a two-dimensional (2D) rendering (e.g. a side perspective), it should be understood that the positions and directions (including 110v and 112p) may have 3D components. The resulting shadow 106c is illustrated having vertical dimension 116a, and located at a vertical position between dimensions 114a and 114b, due to the vertical angular direction component of light vector 110v. The position in the orthogonal (horizontal) dimension may be likewise determinable by the horizontal angular direction component of light vector 110v.

The generated shadows, 106a-106c, may be dynamic in nature, because their computation is sufficiently efficient to be performed in real-time (or near real-time) to update position, size, softness, shape, and/or color based on movements of elements 102 and 104 and lighting vector 110v. For example, as caster 102 moves away from receiver 104, shadow 106a enlarges to shadow 106b and then shadow 106c, becoming larger, lighter, and softer (more highly blurred edges).

Figure 2:
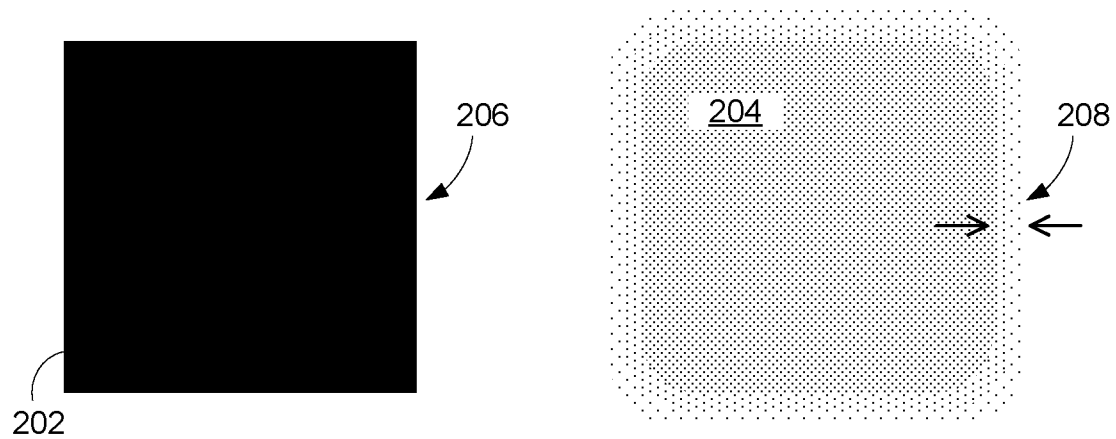
FIG. 2 illustrates shadow fading and sharpness differences.

FIG. 2 illustrates shadow fading and sharpness differences between two exemplary shadows 202 and 204. Shadow 202 is darker and has a sharper edge 206. Shadow 204 is illustrated as a pattern of dots reflecting a fainter shadow. Shadow 204 has a blurred edge region 208, illustrated as a region of deceasing dot density moving away from the center of shadow 204. This is meant to illustrate that, for a blurred shadow, nearby the edge, there may not be as abrupt of an edge. Thus, shadow 202 has a greater sharpness than shadow 204. Shadow 204 has greater fading than shadow 202. Shadow fading may be determined by a shadow fading factor.

Figure 3:
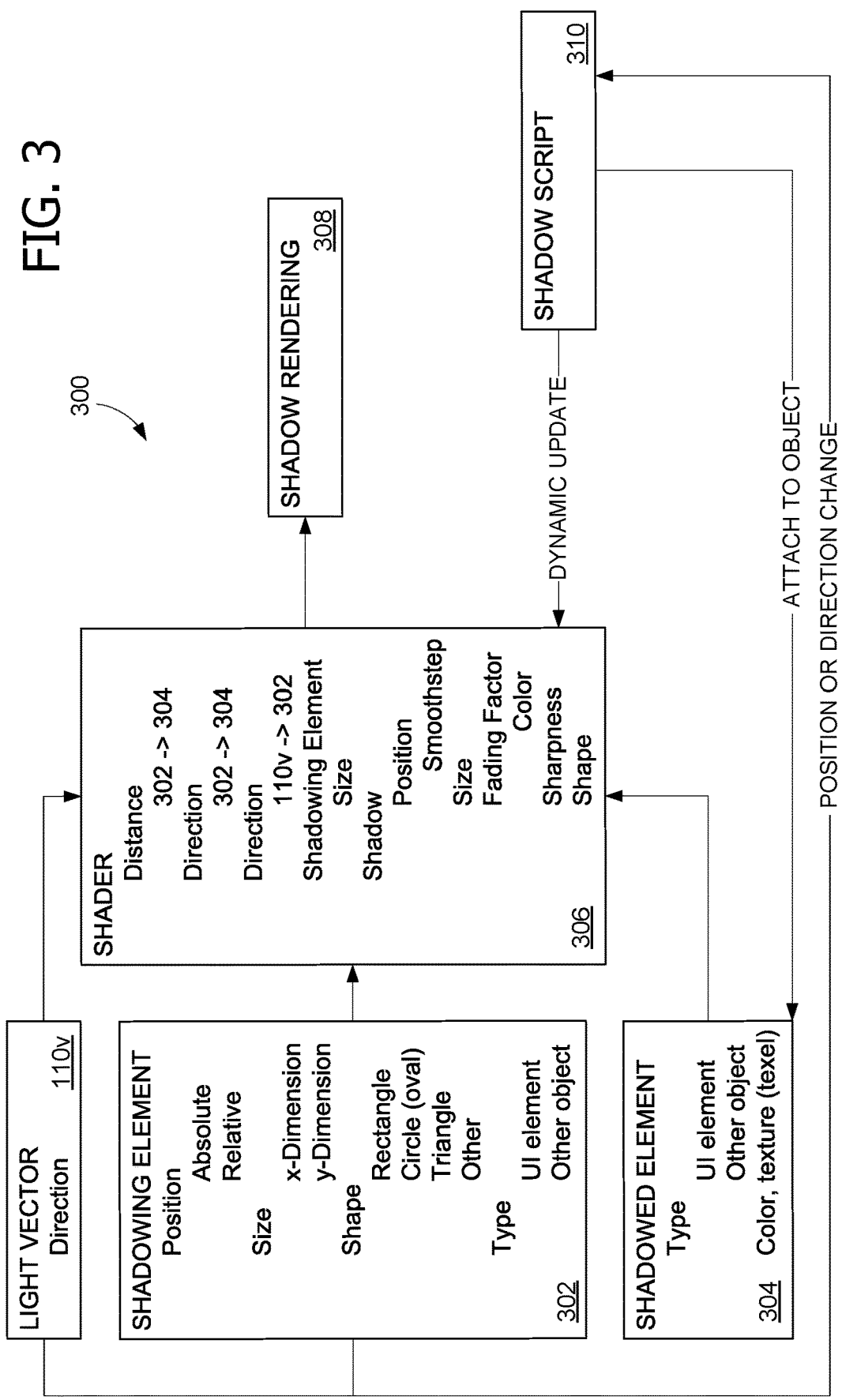
FIG. 3 is a block diagram of a dynamic soft shadow operation.

FIG. 3 is a block diagram of a dynamic soft shadow operation 300. A shadowing element 302 has multiple properties, as illustrated. Position may be absolute or relative; size has multiple dimensional aspects; the shape may be a simple rectangle (quad) or may be a circle (or a general oval), a triangle, or another shape; and may be a UI element or another general object. A shadowed element 304 may be of a type specified as a UI element or another general object, and has a particular color or texture (texel). This color, or the color of the texture, will be rendered as darker when depicting a shadow. For example, white will be rendered as a gray, possibly nearly black, and other colors will be rendered as having less luminosity or brightness intensity. Shadowing element 102 and shadowed element 104 (of FIG. 1) were specific manifestations of general shadowing element 302 and shadowed element 304. Also, as illustrated, light vector 110v has a direction. In some embodiments, light vector 110v may also have a specified intensity and apparent origin and distribution, used to assist in calculating shadow size, shadow fading, and shadow sharpness.

A shader 306 takes as input light vector 110v, shadowing element 302, and shadowed element 304. Using the properties of input light vector 110v, shadowing element 302, and shadowed element 304, certain values and parameters may be determined. These include distance between shadowing element 302 and shadowed element 304; the direction between shadowing element 302 and shadowed element 304 along that distance; and the direction along light vector 110v toward shadowing element 302 that propagates to determine the resulting shadow position on shadowed element 304. Shader 306 may use a smoothstep function to test pixels corresponding to shadowed element 304, to test whether the pixels are within the shadow. The position of the shadow may be defined according to its center location and its edges then determined based on the shadow's size or the shadow position may be defined according to its edges, which already includes the shadow's size. Using the edges of a shadow to define its position includes the shadow's size, which is determined, at least partially, based on the size of shadowing element 302, and its distance (along the direction of the shadow, which is parallel to light vector 110v) from shadowed element 304. For example, shadowing element 302 may be held in a fixed position relative to shadowed element 304, but as light vector 110v sweeps from near-normal incidence on shadowing element 302 toward a grazing angle, the distance along the direction of the shadow, which is parallel to light vector 110v, will increase as the secant of the angle.

This shadow distance may be used in determining the size, sharpness, and fading of the shadow, and is determined using the distance between shadow casting element 302 and shadowed element 304, along with the relative direction between shadow casting element 302 and shadowed element 304, in conjunction with the direction of light vector 110v. The shadow fading, and also sharpness, affect the color of the rendered pixels (either solid color or colored texture) of shadowed element 304, for example making the rendered color darker inversely proportional to shadow fading. A shadow with no fading will result in darker pixels (closer to black) than a shadow with a high degree of fading. Additionally, a shape of the shadow can be determined by the shape of shadowing element 302 and the direction of light vector 110v. For example, a square shadowing element 302 (a special case of a rectangle) may cast an elongated rectangle on shadowed element 304, if light vector 110v has a larger off-normal angle in one dimension (such as horizontal or vertical) than in the other dimension. Similarly, a circular shadowing element 302 may cast an oval shadow under some geometric arrangements.

Shader 306 may perform an initial rendering 308 of a shadow, and generates a shadow script 310 that may be attached to shadowed element 304 to calculate and pass information such as shadow distance to shader 306. Then, as either the position of shadowing element 302 or the direction of light vector 110v changes, shadow script 310 may be used to dynamically update shader 306 to produce with real-time (or near real-time) shadow rendering 308. Shadow script 310 simplifies computations, to make the rendering of a realistic dynamic soft shadow feasible on devices with limited computational power.

Figure 4:
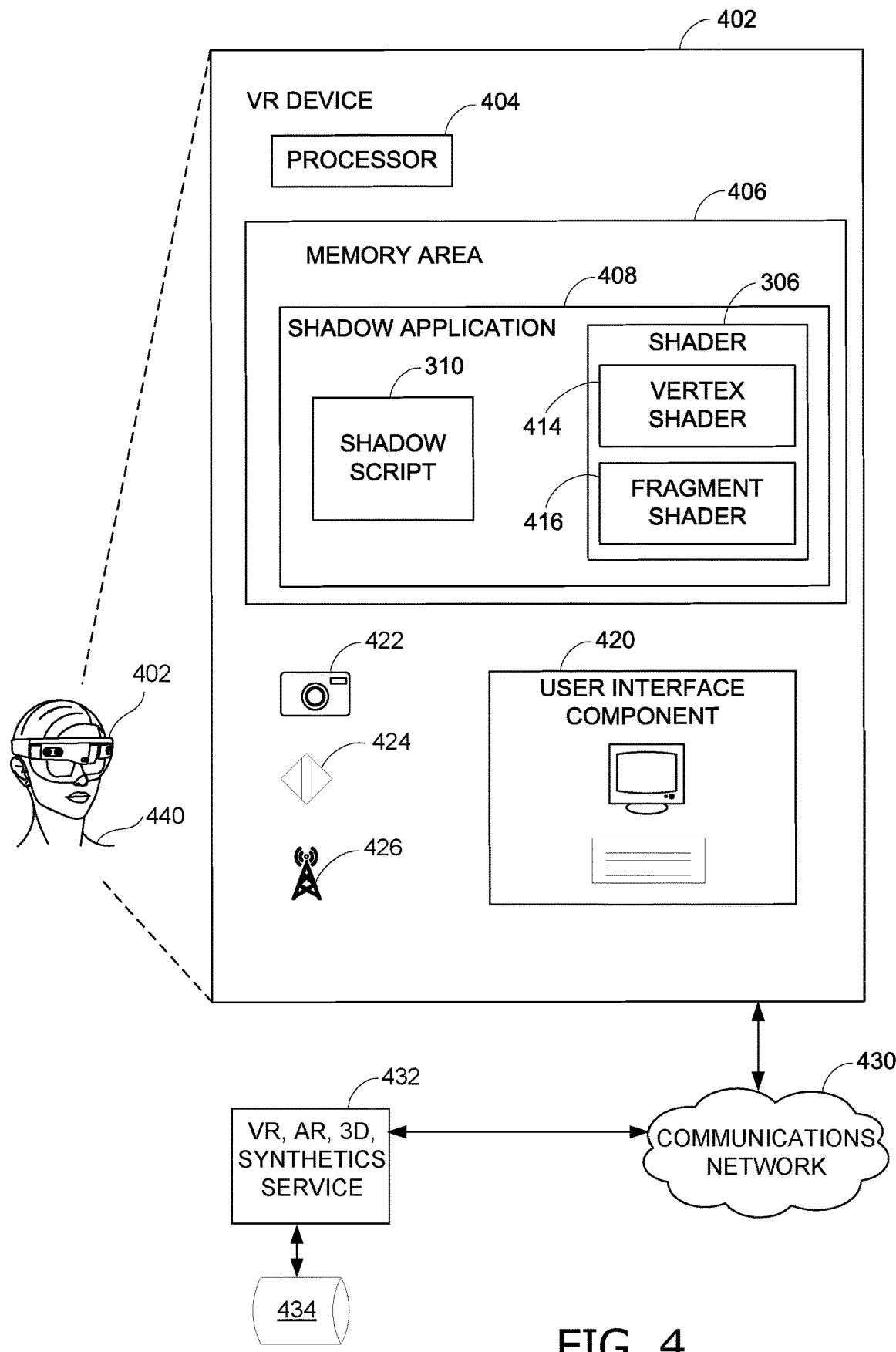
FIG. 4 is a block diagram of a virtual reality (VR) headset equipped with a shadow application capable of generating dynamic soft shadows.

FIG. 4 is a block diagram of a VR device 402 equipped with a shadow application capable of generating dynamic soft shadows, according to some of the various examples disclosed herein. VR device 402 may alternatively take the form of a mobile computing device or any other portable device, including the illustrated HMD worn by a user 440. For example, VR device 402 may be a Hololens®. In some examples, a mobile computing device includes a mobile telephone, laptop, tablet, computing pad, netbook, gaming device, wearable device, HMD and/or portable media player. VR device 402 may also represent less portable devices such as desktop personal computers, kiosks, tabletop devices, industrial control devices, wireless charging stations, electric automobile charging stations, and other physical objects embedded with computing resources and/or network connectivity capabilities. Additionally, VR device 402 may represent a group of processing units or other computing devices, such as for example a combination of a desktop personal computer and an HMD in communication with the desktop personal computer.

In some embodiments, VR device 402 has at least one processor 404, a memory area 406, and at least one user interface component 420, illustrated as having a display and an input component. Processor 404 includes any quantity of processing units and is programmed to execute computer-executable instructions for implementing aspects of the disclosure. The instructions may be performed by the processor 404 or by multiple processors 404 within VR device 402 or performed by a processor external to the VR device 402. In some examples, processor 404 is programmed to execute instructions such as those that may be illustrated in the other figures. In some examples, processor 404 represents an implementation of analog techniques to perform the operations described herein. For example, the operations may be performed by an analog computing device and/or a digital computing device.

The user interface component 420 may include a display with a quantity of pixels or other components for displaying elements 102, 302, 104, 304 and shadows 106a, 106b, 106c, 202, 204 described in relation to the prior figures. For example, user interface component 420 may include a mixed-reality display that takes imagery captured through a camera 422 of the VR device 402 and adds virtual content that includes dynamic shadows disclosed herein. Additionally, VR device 402 may include one or more sensors 424 for capturing environmental data about a surrounding environment (e.g., thermometer, microphone, GPS, and the like) or user data from user 440 wearing the VR device 402 (e.g., speech, biometric recognition, motion, orientation, and the like). Further still, VR device 402 may also include a transceiver 426 for communicating data across a network 430. In some embodiments, VR device 402 may access a synthetics service 434 via network 430. Synthetics service 434 may use a data store 434 for synthetic objects and provide data for AR, VR, including 3D gaming, and object recognition.

VR device 402 also has one or more computer-storage media represented as memory area 406. Memory area 406 includes any quantity of computer-storage media associated with or accessible by VR device 402. In particular, the memory area 406 stores a shadow application 408 for generating a dynamic soft shadow. Shadow application 408 includes shadow script 310 and shader 306. Shader 306 includes a vertex shader 414 and a fragment shader 416. Shadow application 408, and its constituent parts, are executable by processor 404 to generate dynamic soft shadows on a shadowed element (receiver).

In some embodiments, shadow application 408 generates a dynamic soft shadow in the following manner. Shadow script 310 retrieves and passes the caster (shadowing) element size and position relative to the receiving element 104 to shader 306. The vertex shader 414 initially calculates and stores holding values that represent the casting element size and position relative to the receiving element, and for the fading amount, as well as the size of the enlarged shadow that includes its soft part. For example, this may be implemented in the code provided below (e.g., using o.casterCenter.w, o.casterSize.zw, as both casterCenter and casterSize initialized as vector4 in the example code below).

Vertex shader 414 modifies these values by a light direction vector (e.g., light vector 110v); relative distance between the caster and receiver elements (along a direction parallel to light vector 110v); and a shadow fading factor, and the modified values are then passed to the fragment shader 416. In some embodiments, fragment shader 416 uses a smoothstep function to test each pixel's position on the quad against the modified values from the previous step. While doing this testing, the position- and distance-adjusted values are used as thresholds. As position and distance variables change values (e.g., due to the casting element moving), the testing thresholds change as well, consequently producing an interpolated value between 0 and 1 for each of the pixels. These interpolated values are used to render the dynamic soft shadow on the receiver element. In some embodiments, the color of the rendered dynamic soft shadow is adjusted based on the distance between the caster element and the receiver element.

An example embodiment of shader 306 is provided below. Alternative ways to implement vertex shader 414 and fragment shader 416 are possible.

```
Shader "Custom/card_with_shadow"
{
    Properties
    {
        _Color("Base color", Color) = (0.5, 0.5, 0.5, 1)
        _Shadow_Color("Shadow color", Color) = (0, 0, 0, 1)
        _Margin("Margin x, y, Center Soft x, y", Vector) = (0.02, 0.02, 0, 0)
        _LightDir("Light Direction: x, y, z", Vector) = (0, 0, 1, 1)
        _Shadow_center("Caster center x, y, z", Vector) = (0, 0, 0, 1) //these values are
        updated every frame with a script to capture the center position of the caster
        object relative to the receiving object
        _Shadow_size("Caster size x, y, z", Vector) = (0, 0, 0, 1)
        //these values are updated every frame with a script to capture the size of the
        caster object
        _Shadow_fade("Shadow: Sharpness, Fade rate", Vector) = (0.01, 3, 1, 1)
        _Alpha("Alpha", Range(0, 1)) = 1
    }
    SubShader
    {
        Tags
        {
            "Queue" = "Transparent"
            "RenderType" = "Transparent"
        }
        Pass
        {
            Fog{ Mode Off }
            Lighting Off
            Blend SrcAlpha OneMinusSrcAlpha
            CGPROGRAM
            #pragma vertex vert
            #pragma fragment frag
            #include "UnityCG.cginc"
            #pragma target 5.0
                    fixed4 _Color;
            fixed4 _Margin;
            fixed4 _Shadow_Color;
            fixed4 _Shadow_center;
            fixed4 _Shadow_size;
            fixed4 _Shadow_fade;
            fixed4 _LightDir;
            fixed _Alpha;
            struct appdata
            {
                float4 vertex : POSITION;
                fixed4 texcoord : TEXCOORD0;
            };
            struct v2f
            {
                float4 position : SV_POSITION;
                fixed4 uv : TEXCOORD0;
                fixed4 margin : TEXCOORD1;
                fixed4 casterCenter : TEXCOORD2;
                fixed4 casterSize : TEXCOORD3;
                fixed2 pos : TEXCOORD4;
            };
```

```
        v2f vert(appdata v)
        {
            v2f o;
            o.position = UnityObjectToClipPos(v.vertex);
            o.uv.xy = v.texcoord;
            o.uv.zw = (v.texcoord.xy − 0.5) * 2;
            o.margin = __Margin;
            o.margin.xy = 0.5 − __Margin.xy;
            ////////////////////////////
            //Prepare info for shadow
            o.casterCenter = __Shadow__center;
            o.casterSize.xy = __Shadow__size;
            o.pos = (v.texcoord.xy − 0.5) * 2;
            //Light direction changes shadow position
            fixed3 dir = normalize(__LightDir.xyz);
            o.casterCenter.xy += dir.xy * max(−o.casterCenter.z, 0);
            o.casterCenter.w = __Shadow__fade.y / (−o.casterCenter.z) *
            step(o.casterCenter.z, 0);
            //The amount of shadow fading is affected by the distance between
            casting and receiving objects
            o.casterSize.zw = o.casterSize.xy + max(−o.casterCenter.z, 0) *
            __Shadow__fade.xx;
            //The max size of shadow is affected by the distance between casting
            and receiving objects
            ////////////////////////////
            return o;
        }
        min16float4 frag(v2f i) : COLOR
        {
            min16float4 frag(v2f i) : COLOR
            {
            min16float alpha = __Alpha;
            min16float4 texcol = (min16float4)__Color;
            min16float4 margin = (min16float4)i.margin;
            min16float4 uv = (min16float4)i.uv;
                min16float2 pos = (min16float2)i.pos;
            ////////////////////////////////////////Draw anti-aliased quad
            min16float2 disAxis = uv;
            disAxis = abs(uv.xy − (min16float2)0.5);
            min16float2 d = fwidth(disAxis);
            min16float2 mask = smoothstep(margin.xy + d, margin.xy − d −
            margin.zw, disAxis);
                    texcol.a = mask.x * mask.y;
                    texcol.a *= alpha;
            ////////////////////////////////////////Draw Shadow
            min16float4 shadowCol = __Shadow__Color;
                    min16float4 center = i.casterCenter;
                    min16float4 casterSize = i.casterSize;
                    center.xyz *= −(min16float)2;
            //The size and softness of shadow are affected by the distance between
            casting and //receiving objects
            min16float2 shadow = smoothstep(casterSize.zw, casterSize.xy,
            abs(pos.xy +
            center.xy));
            texcol.xyz *= lerp((min16float3)1, shadowCol.xyz, min(max(shadow.x
            * shadow.y * center.w, (min16float)0.01), (min16float)0.735));
            return texcol;
        }
        ENDCG
    }
  }
}
```

While shown in a VR device 402, the disclosed shadow application 408 may alternatively be stored and executed on a client computer (e.g., laptop, personal computer, or the like); a mobile computing device (e.g., a tablet, smartphone, wearable device, or the like); or on a cloud or virtual machine in a cloud-computing environment. Thus, embodiments disclosed herein are not limited to merely VR devices 402, as other computing devices may host and/or execute the shadow application 408.

Figure 5:
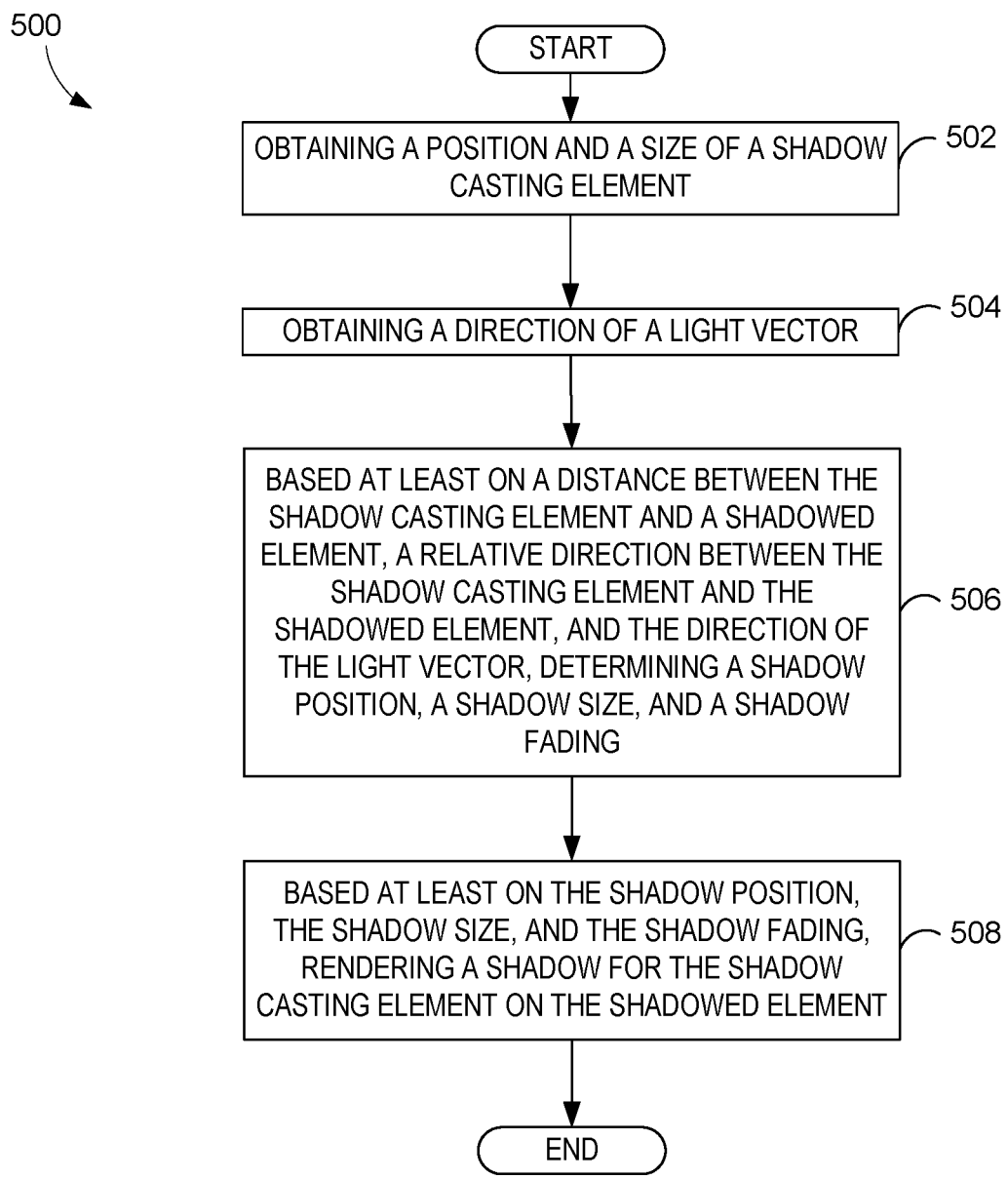
FIG. 5 is a flowchart diagram of a work flow for generating dynamic soft shadows.

FIG. 5 is a flowchart diagram 500 of a work flow for generating dynamic soft shadows. Operation 502 includes obtaining a position and a size of a shadow casting element. Operation 504 includes obtaining a direction of a light vector. Operation 506 includes, based at least on a distance between the shadow casting element and a shadowed element, a relative direction between the shadow casting element and the shadowed element, and the direction of the light vector, determining a shadow position, a shadow size, and a shadow fading. Operation 508 includes, based at least on the shadow position, the shadow size, and the shadow fading, rendering a shadow for the shadow casting element on the shadowed element.

In an alternative operation for generating dynamic soft shadows, a shader adds holding values for the position and size of a shadow casting element (caster element) as well as the size of the enlarged shadow that includes its soft part. A vertex shader modifies and calculates these holding values by a light direction vector, relative distance between caster and (shadowed) receiver elements, and a shadow fading factor. A fragment shader then uses a smoothstep function to test pixel positions against the modified holding values. While performing the testing, the position and distance adjusted values are used as thresholds. As position and distance variables change values, the testing thresholds change with them, and the function returns an interpolated value between 0 and 1. A shadow is then rendered on the receiving (shadowed) element using, at least partially, the testing data determined previously. A script is attached to the receiver element that passes the caster element's position and size to the shader. As a result, when the caster element moves around, the shadow follows it on the receiver element. For example, when the caster element moves away or close to the receiver element, the rendered shadow's sharpness and darkness changes, creating a real-time soft shadow casting. The holding values may be initialized using o.casterCenter.w, o.casterSize.zw, as both casterCenter and casterSize being initialized as vector4 in the code reproduced above.

Figure 6:
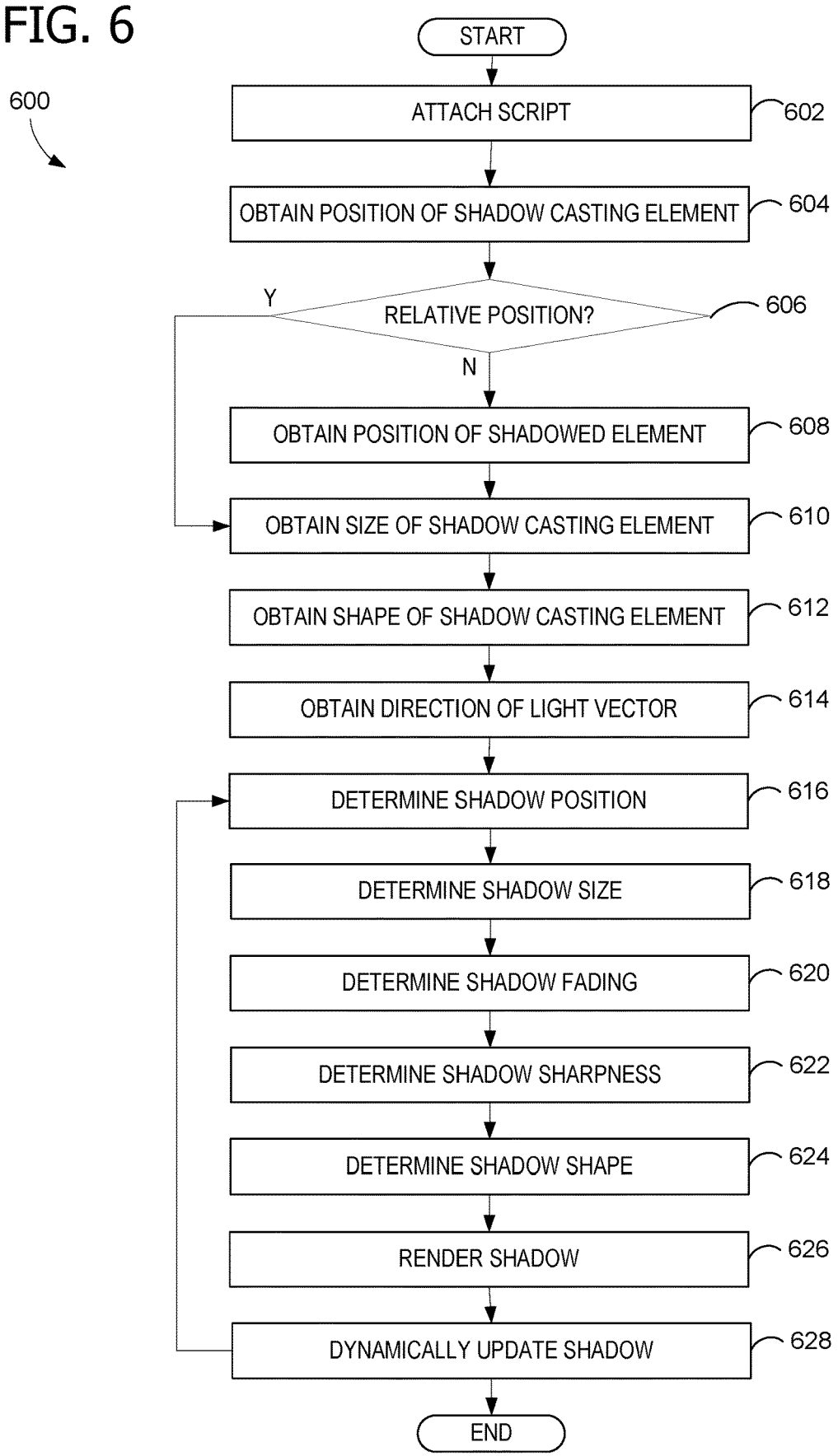
FIG. 6 is another flowchart diagram of a work flow for generating dynamic soft shadows.

FIG. 6 is another flowchart diagram 600 of a work flow for generating dynamic soft shadows. Operation 602 includes attaching a script to the shadowed element that will pass. information to a shader to permit dynamic updating of the rendered shadow. Operation 604 includes obtaining the position of the shadow casting element. The obtained position of the shadow casting element may be a relative position, relative to the shadowed element, and thus may already include the distance between the shadow casting element and the shadowed element and the relative direction between the shadow casting element and the shadowed element. Decision operation 606 determines whether the position is relative, and if not, operation 608 includes obtaining a position of the shadowed element, and based at least on the position of the shadow casting element and the position of the shadowed element, determining the distance between the shadow casting element and the shadowed element and the relative direction between the shadow casting element and the shadowed element. In some embodiments the shadowing element and/or the shadowed element may comprise UI elements. If, however, decision operation 606 determines that the position is relative, the process may jump directly to operation 610.

Operation 610 includes obtaining a size of a shadow casting element, so that by this point, the combinations of operations 604, 608, and 610 have obtained the position and the size of the shadow casting element. Operation 612 includes obtaining a shape of the shadow casting element, which in some embodiments may comprise a quad (rectangle) or another shape. Operation 614 includes obtaining a direction of a light vector. These values may then be used in other operations, although it should be understood that various orders of operations may be possible.

Operation 616 includes determining a shadow position, operation 618 includes determining a shadow size; and operation 620 includes determining a shadow fading. The combination of operations 616, 618, and 620 therefore include, based at least on a distance between the shadow casting element and a shadowed element, a relative direction between the shadow casting element and the shadowed element, and the direction of the light vector, determining a shadow position, a shadow size, and a shadow fading. Operation 622 includes, based at least on the distance between the shadow casting element and the shadowed element, the relative direction between the shadow casting element and the shadowed element, and the direction of the light vector, determining a shadow sharpness. Operation 624 includes determining a shadow shape. This may be accomplished by starting with the shape of shadow casting element and distort the shadow based on the secant of the light vector direction in each dimension.

Operation 626 includes rendering a shadow for the shadow casting element comprises based at least on the shadow position, the shadow size, and the shadow fading, rendering a shadow for the shadow casting element on the shadowed element. In some embodiments, rendering a shadow for the shadow casting element comprises based at least on the shadow position, the shadow size, the shadow fading, and the shadow sharpness, rendering a shadow for the shadow casting element on the shadowed element. In some embodiments, rendering a shadow for the shadow casting element comprises based at least on the shadow position, the shadow size, the shadow fading and the shape of the shadow casting element, rendering a shadow for the shadow casting element on the shadowed element. In some embodiments, rendering a shadow for the shadow casting element comprises based at least on the shadow position, the shadow size, the shadow fading, the shadow sharpness, and the shape of the shadow casting element, rendering a shadow for the shadow casting element on the shadowed element. In some embodiments, rendering a shadow for the shadow casting element comprises testing positions of pixels against the shadow position. In some embodiments, rendering a shadow for the shadow casting element comprises rendering a soft shadow in a single-pass operation.

Dynamically updating the shadow occurs in ongoing operations 604-628. In some embodiments, operations 604-614 may occur only a single time for each of multiple iterations of operation 616-628. If there is no need for dynamic updating, for example, shadow casting element and light direction may not change over time.

ADDITIONAL EXAMPLES

Some aspects and examples disclosed herein are directed to a solution for rendering a soft shadow comprising: a processor; and a computer-readable medium storing instructions that are operative when executed by the processor to: obtain a position and a size of a shadow casting element; obtain a direction of a light vector; based at least on a distance between the shadow casting element and a shadowed element, a relative direction between the shadow casting element and the shadowed element, and the direction of the light vector, determine a shadow position, a shadow size, and a shadow fading; and based at least on the shadow position, the shadow size, and the shadow fading, render a shadow for the shadow casting element on the shadowed element.

Additional aspects and examples disclosed herein are directed to a process for rendering a soft shadow comprising: obtaining a position and a size of a shadow casting element; obtaining a direction of a light vector; based at least on a distance between the shadow casting element and a shadowed element, a relative direction between the shadow casting element and the shadowed element, and the direction of the light vector, determining a shadow position, a shadow size, and a shadow fading; and based at least on the shadow position, the shadow size, and the shadow fading, rendering a shadow for the shadow casting element on the shadowed element.

Additional aspects and examples disclosed herein are directed to a one or more computer storage devices having computer-executable instructions stored thereon for rendering a soft shadow, which, on execution by a computer, cause the computer to perform operations that may comprise: obtaining a position and a size and a shape of a shadow casting element, wherein the shadow casting element comprises a UI element; obtaining a direction of a light vector; based at least on a distance between the shadow casting element and a shadowed element, a relative direction between the shadow casting element and the shadowed element, and the direction of the light vector, determining a shadow position, a shadow size, a shadow fading, a shadow sharpness, and a shadow shape; and based at least on the shadow position, the shadow size, the shadow fading, the shadow sharpness, and the shadow shape, rendering a shadow for the shadow casting element on the shadowed element, wherein the shadowed element comprises a UI element, wherein rendering a shadow for the shadow casting element comprises testing positions of pixels against the shadow position, and wherein rendering a shadow for the shadow casting element comprises rendering a soft shadow in a single-pass operation; and attaching a script to the shadowed element that passes information to a shader for dynamic updating of the rendered shadow.

Alternatively, or in addition to the other examples described herein, examples include any combination of the following:

the obtained position of the shadow casting element is a relative position, relative to the shadowed element, and includes the distance between the shadow casting element and the shadowed element and the relative direction between the shadow casting element and the shadowed element;

obtaining a position of the shadowed element; and based at least on the position of the shadow casting element and the position of the shadowed element, determining the distance between the shadow casting element and the shadowed element and the relative direction between the shadow casting element and the shadowed element;

based at least on the distance between the shadow casting element and the shadowed element, the relative direction between the shadow casting element and the shadowed element, and the direction of the light vector, determining a shadow sharpness, wherein rendering a shadow for the shadow casting element comprises based at least on the shadow position, the shadow size, the shadow fading, and the shadow sharpness, rendering a shadow for the shadow casting element on the shadowed element;

obtaining a shape of the shadow casting element, wherein rendering a shadow for the shadow casting element comprises based at least on the shadow position, the shadow size, the shadow fading and the shape of the shadow casting element, rendering a shadow for the shadow casting element on the shadowed element;

the shadow casting element comprises a UI element;

the shadowed element comprises a UI element;

rendering a shadow for the shadow casting element comprises testing positions of pixels against the shadow position; and attaching a script to the shadowed element that passes information to a shader for dynamic updating of the rendered shadow; and rendering a shadow for the shadow casting element comprises rendering a soft shadow in a single-pass operation.

While the aspects of the disclosure have been described in terms of various examples with their associated operations, a person skilled in the art would appreciate that a combination of operations from any number of different examples is also within scope of the aspects of the disclosure.

Example Operating Environment

Figure 7:
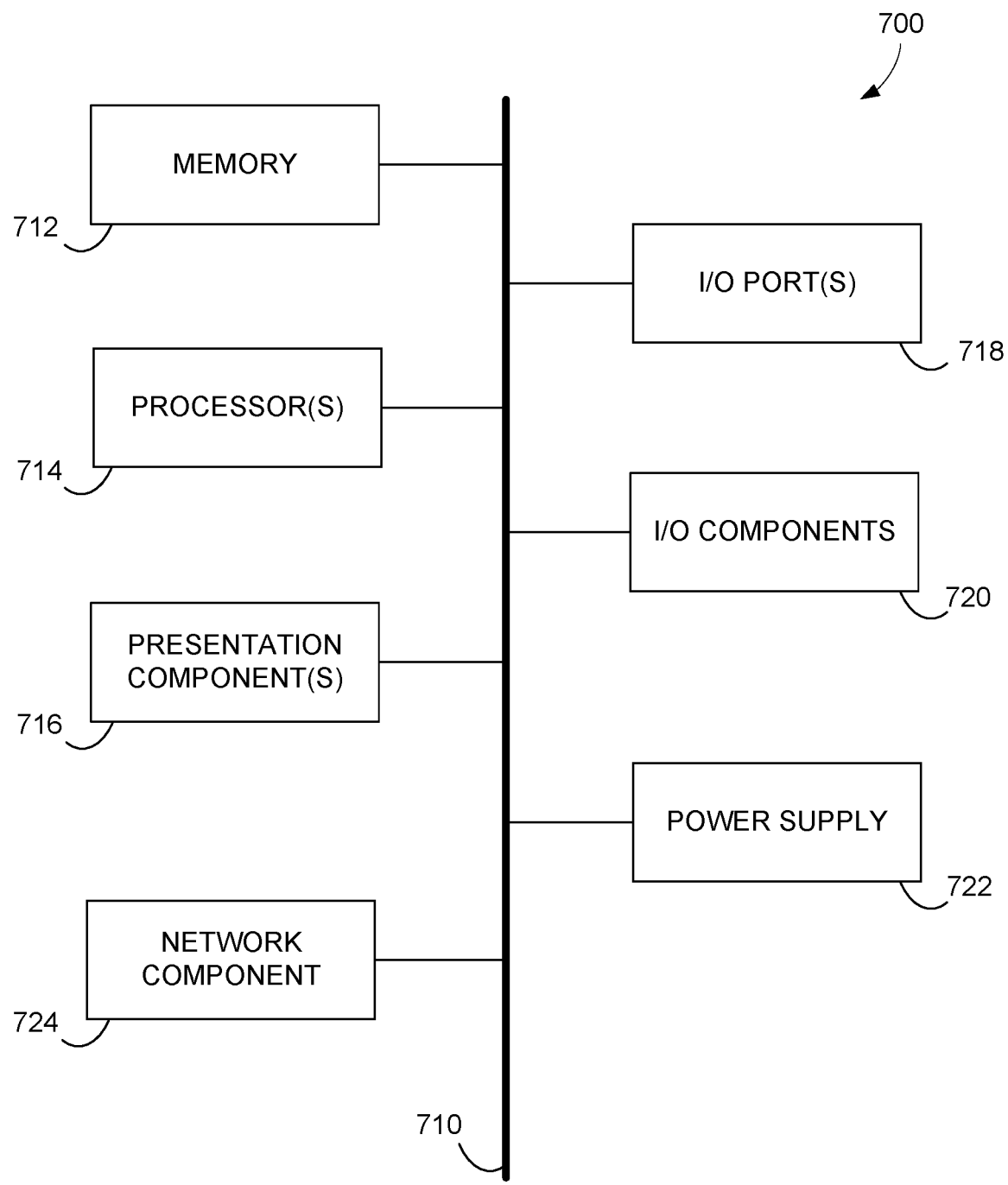
FIG. 7 is a block diagram of an example computing environment suitable for implementing some of the various examples disclosed herein.

FIG. 7 is a block diagram of an example computing device 700 for implementing aspects disclosed herein, and is designated generally as computing device 700. Computing device 700 is but one example of a suitable computing environment and is not intended to suggest any limitation as to the scope of use or functionality of the embodiments disclosed herein. Neither should the computing device 700 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments, such as those disclosed in FIG. 8 described in more detail below, where tasks are performed by remote-processing devices that are linked through a communications network.

Computing device 700 includes a bus 710 that directly or indirectly couples the following devices: computer-storage memory 712, one or more processors 714, one or more presentation components 716, input/output (I/O) ports 718, I/O components 720, a power supply 722, and a network component 724. Computer device 700 should not be interpreted as having any dependency or requirement related to any single component or combination of components illustrated therein. While computer device 700 is depicted as a seemingly single device, multiple computing devices 700 may work together and share the depicted device resources. For instance, computer-storage memory 712 may be distributed across multiple devices, processor(s) 714 may provide housed on different devices, and so on.

Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 7 is merely illustrative of an exemplary computing device that can be used in connection with one or more disclosed embodiments. Distinction is not made between such categories as "workstation," "server," "laptop," "handheld device," etc., as all are contemplated within the scope of FIG. 7 and the references herein to a "computing device."

Computer-storage memory 712 may take the form of the computer-storage media references below and operatively provide storage of computer-readable instructions, data structures, program modules and other data for the computing device 700. For example, computer-storage memory 712 may store an operating system, a universal application platform, or other program modules and program data. Computer-storage memory 712 may be used to store and access instructions configured to carry out the various operations disclosed herein.

As mentioned below, computer-storage memory 712 may include computer-storage media in the form of volatile and/or nonvolatile memory, removable or non-removable memory, data disks in virtual environments, or a combination thereof And computer-storage memory 712 may include any quantity of memory associated with or accessible by the display device 700. The memory 712 may be internal to the display device 700 (as shown in FIG. 7), external to the display device 700 (not shown), or both (not shown). Examples of memory 712 in include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the display device 700. Additionally or alternatively, the computer-storage memory 712 may be distributed across multiple display devices 700, e.g., in a virtualized environment in which instruction processing is carried out on multiple devices 700. For the purposes of this disclosure, "computer storage media," "computer-storage memory," "memory," and "memory devices" are synonymous terms for the computer-storage media 712, and none of these terms include carrier waves or propagating signaling.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flowcharts discussed below and depicted in the accompanying drawings. Moreover, in some examples, the processor(s) 714 represent an implementation of analog techniques to perform the operations described herein. For example, the operations may be performed by an analog client computing device 700 and/or a digital client computing device 700.

Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways.

Ports 718 allow computing device 700 to be logically coupled to other devices including I/O components 720, some of which may be built in. Examples I/O components 720 include, for example but without limitation, a microphone, joystick, game pad, satellite dish, scanner, printer, wireless device, etc.

The computing device 700 may operate in a networked environment via the network component 724 using logical connections to one or more remote computers. In some examples, the network component 724 includes a network interface card and/or computer-executable instructions (e.g., a driver) for operating the network interface card. Communication between the computing device 700 and other devices may occur using any protocol or mechanism over any wired or wireless connection. In some examples, the network component 724 is operable to communicate data over public, private, or hybrid (public and private) using a transfer protocol, between devices wirelessly using short range communication technologies (e.g., near-field communication (NFC), Bluetooth™ branded communications, or the like), or a combination thereof Turning now to FIG. 8, an exemplary block diagram illustrates a cloud-computing architecture 800, suitable for use in implementing aspects of this disclosure. Architecture 800 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

Figure 8:
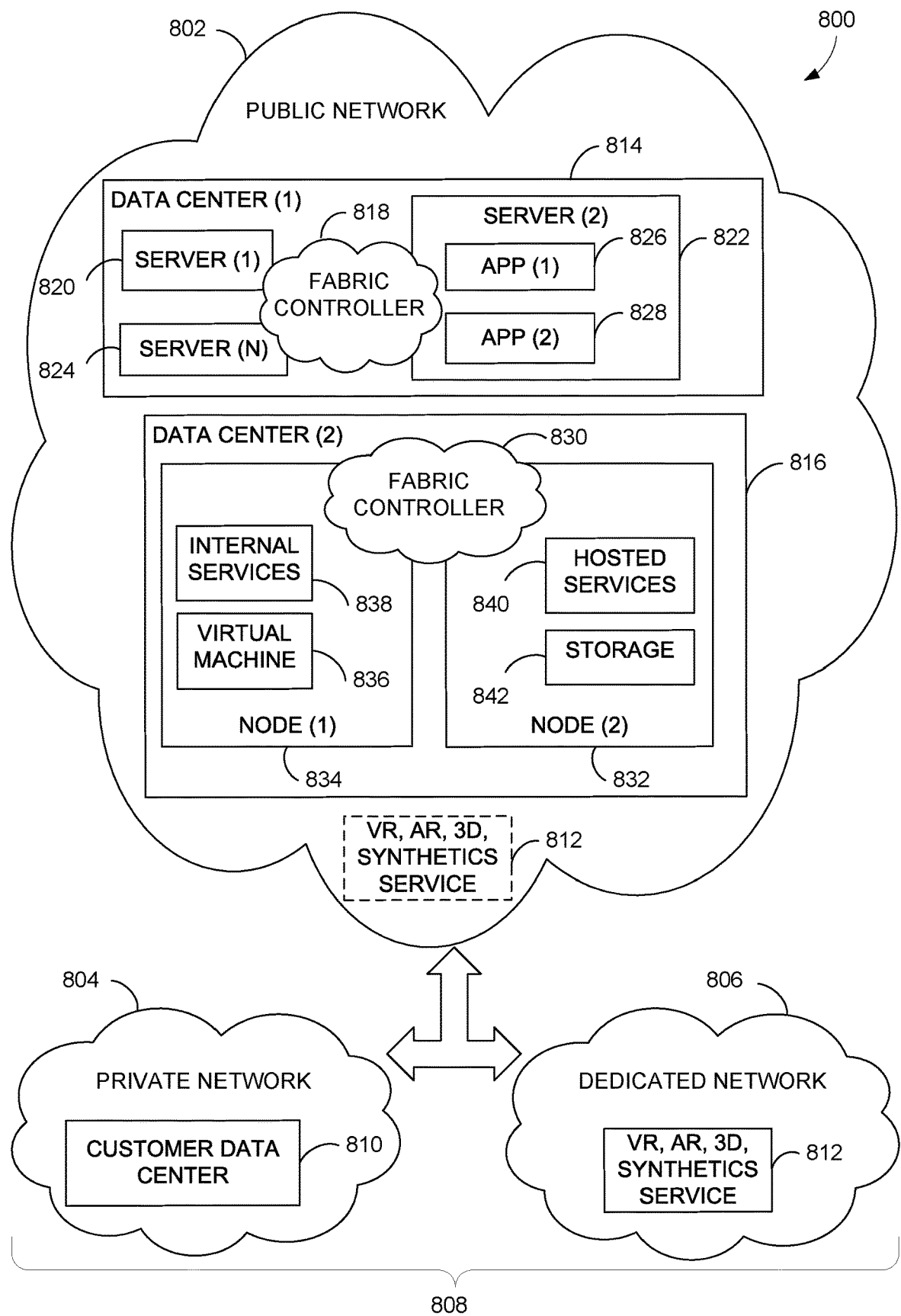
FIG. 8 is a block diagram of an example cloud-computing infrastructure suitable for a synthetics service implementing some of the various examples disclosed herein.

The distributed computing environment of FIG. 8 includes a public network 802, a private network 804, and a dedicated network 806. Public network 802 may be a public cloud-based network of computing resources, for example. Private network 804 may be a private enterprise network or private cloud-based network of computing resources. And dedicated network 806 may be a third-party network or dedicated cloud-based network of computing resources. In some examples, private network 804 may host a customer data center 810, and dedicated network 806 may host cloud synthetics services 812 (which may be similar to synthetics service 432 of FIG. 4).

Hybrid cloud 808 may include any combination of public network 802, private network 804, and dedicated network 806. For example, dedicated network 806 may be optional, with hybrid cloud 808 comprised of public network 802 and private network 804. Along these lines, some customers may opt to only host a portion of their customer data center 810 in the public network 802 and/or dedicated network 806, retaining some of the customers' data or hosting of customer services in the private network 804. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 808 in which some data storage and processing is performed in the public network 802 while other data storage and processing is performed in the dedicated network 806.

Public network 802 may include data centers configured to host and support operations, including tasks of a distributed application, according to the fabric controller 818. It will be understood and appreciated that data center 814 and data center 816 shown in FIG. 8 are merely examples of suitable implementations for accommodating one or more distributed applications, and are not intended to suggest any limitation as to the scope of use or functionality of examples disclosed herein. Neither should data center 814 and data center 816 be interpreted as having any dependency or requirement related to any single resource, combination of resources, combination of servers (e.g., servers 820 and 824) combination of nodes (e.g., nodes 832 and 834), or a set of application programming interfaces (APIs) to access the resources, servers, and/or nodes.

Data center 814 illustrates a data center comprising a plurality of servers, such as servers 820 and 824. A fabric controller 818 is responsible for automatically managing the servers 820 and 824 and distributing tasks and other resources within the data center 814. By way of example, the fabric controller 818 may rely on a service model (e.g., designed by a customer that owns the distributed application) to provide guidance on how, where, and when to configure server 822 and how, where, and when to place application 826 and application 828 thereon. One or more role instances of a distributed application may be placed on one or more of the servers 820 and 824 of data center 814, where the one or more role instances may represent the portions of software, component programs, or instances of roles that participate in the distributed application. In other examples, one or more of the role instances may represent stored data that are accessible to the distributed application.

Data center 816 illustrates a data center comprising a plurality of nodes, such as node 832 and node 834. One or more virtual machines may run on nodes of data center 816, such as virtual machine 836 of node 834 for example. Although FIG. 8 depicts a single virtual node on a single node of data center 816, any number of virtual nodes may be implemented on any number of nodes of the data center in accordance with illustrative embodiments of the disclosure. Generally, virtual machine 836 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 836 may include processing capacity, storage locations, and other assets within the data center 816 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 830 is responsible for automatically managing the virtual machines running on the nodes of data center 816 and for placing the role instances and other resources (e.g., software components) within the data center 816. By way of example, the fabric controller 830 may rely on a service model (e.g., designed by a customer that owns the service application) to provide guidance on how, where, and when to configure the virtual machines, such as virtual machine 836, and how, where, and when to place the role instances thereon.

As described above, the virtual machines may be dynamically established and configured within one or more nodes of a data center. As illustrated herein, node 832 and node 834 may be any form of computing devices, such as, for example, a personal computer, a desktop computer, a laptop computer, a mobile device, a consumer electronic device, a server, the computing device 700 of FIG. 7, and the like. In one instance, the nodes 832 and 834 host and support the operations of the virtual machine(s) 836, while simultaneously hosting other virtual machines carved out for supporting other tenants of the data center 816, such as internal services 838, hosted services 840, and storage 842. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 802. The network cloud serves to interconnect resources, such as the role instances, which may be distributed across various physical hosts, such as nodes 832 and 834. In addition, the network cloud facilitates communication over channels connecting the role instances of the service applications running in the data center 816. By way of example, the network cloud may include, without limitation, one or more communication networks, such as local area networks (LANs) and/or wide area networks (WANs). Such communication networks are commonplace in offices, enterprise-wide computer networks, intranets, and the Internet, and therefore need not be discussed at length herein.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The examples illustrated and described herein, as well as examples not specifically described herein but within the scope of aspects of the disclosure, constitute exemplary means for providing an immersive feedback loop for improving AI in a cloud computing environment. The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of " The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for rendering a soft shadow, the system comprising:
    a processor; and
    a computer-readable medium storing instructions that are operative when executed by the processor to:
        obtain a position and a size of a shadow casting element;
        obtain a direction of a light vector;
        based at least on a distance between the shadow casting element and a shadowed element, a relative direction between the shadow casting element and the shadowed element, and the direction of the light vector, determine a shadow position, a shadow size, and a shadow fading;
        based at least on the shadow position, the shadow size, and the shadow fading, render a shadow for the shadow casting element on the shadowed element; and
        attach a script to the shadowed element that passes information to a shader for dynamic updating of the rendered shadow; and
        dynamically update the rendered shadow using the attached script.

2. The system of claim 1 wherein the obtained position of the shadow casting element is a relative position, relative to the shadowed element, and includes the distance between the shadow casting element and the shadowed element and the relative direction between the shadow casting element and the shadowed element.

3. The system of claim 1 wherein the instructions are further operative to:
    obtain a position of the shadowed element; and
    based at least on the position of the shadow casting element and the position of the shadowed element, determine the distance between the shadow casting element and the shadowed element and the relative direction between the shadow casting element and the shadowed element.

4. The system of claim 1 wherein the instructions are further operative to:
    based at least on the distance between the shadow casting element and the shadowed element, the relative direction between the shadow casting element and the shadowed element, and the direction of the light vector, determine a shadow sharpness,
    wherein rendering a shadow for the shadow casting element comprises based at least on the shadow position, the shadow size, the shadow fading, and the shadow sharpness, rendering a shadow for the shadow casting element on the shadowed element.

5. The system of claim 1 wherein the instructions are further operative to:
    obtain a shape of the shadow casting element,
    wherein rendering a shadow for the shadow casting element comprises based at least on the shadow position, the shadow size, the shadow fading and the shape of the shadow casting element, rendering a shadow for the shadow casting element on the shadowed element.

6. The system of claim 1 wherein the shadow casting element comprises a user interface (UI) element.

7. The system of claim 1 wherein rendering a shadow for the shadow casting element comprises testing positions of pixels against the shadow position.

8. The system of claim 1 wherein rendering a shadow for the shadow casting element comprises rendering a soft shadow in a single-pass operation.

9. A method of rendering a soft shadow, the method comprising:
obtaining a position and a size of a shadow casting element;
obtaining a direction of a light vector;
based at least on a distance between the shadow casting element and a shadowed element, a relative direction between the shadow casting element and the shadowed element, and the direction of the light vector, determining a shadow position, a shadow size, and a shadow fading; and
based at least on the shadow position, the shadow size, and the shadow fading, rendering a shadow for the shadow casting element on the shadowed element;
attaching a script to the shadowed element that passes information to a shader for dynamic updating of the rendered shadow; and
dynamically updating the rendered shadow using the attached script.

10. The method of claim 9 wherein the obtained position of the shadow casting element is a relative position, relative to the shadowed element, and includes the distance between the shadow casting element and the shadowed element and the relative direction between the shadow casting element and the shadowed element.

11. The method of claim 9 further comprising:
obtaining a position of the shadowed element; and
based at least on the position of the shadow casting element and the position of the shadowed element, determining the distance between the shadow casting element and the shadowed element and the relative direction between the shadow casting element and the shadowed element.

12. The method of claim 9 further comprising:
based at least on the distance between the shadow casting element and the shadowed element, the relative direction between the shadow casting element and the shadowed element, and the direction of the light vector, determining a shadow sharpness,
wherein rendering a shadow for the shadow casting element comprises based at least on the shadow position, the shadow size, the shadow fading, and the shadow sharpness, rendering a shadow for the shadow casting element on the shadowed element.

13. The method of claim 9 further comprising:
obtaining a shape of the shadow casting element,
wherein rendering a shadow for the shadow casting element comprises based at least on the shadow position, the shadow size, the shadow fading and the shape of the shadow casting element, rendering a shadow for the shadow casting element on the shadowed element.

14. The method of claim 9 wherein the shadow casting element comprises a user interface (UI) element.

15. The method of claim 9 wherein rendering a shadow for the shadow casting element comprises testing positions of pixels against the shadow position.

16. The method of claim 9 wherein rendering a shadow for the shadow casting element comprises rendering a soft shadow in a single-pass operation.

17. One or more computer storage devices having computer-executable instructions stored thereon for rendering a soft shadow, which, on execution by a computer, cause the computer to perform operations comprising:
obtaining a position and a size and a shape of a shadow casting element, wherein the shadow casting element comprises a user interface (UI) element;
obtaining a direction of a light vector;
based at least on a distance between the shadow casting element and a shadowed element, a relative direction between the shadow casting element and the shadowed element, and the direction of the light vector, determining a shadow position, a shadow size, a shadow fading, a shadow sharpness, and a shadow shape; and
based at least on the shadow position, the shadow size, the shadow fading, the shadow sharpness, and the shadow shape, rendering a shadow for the shadow casting element on the shadowed element,
wherein the shadowed element comprises a UI element,
wherein rendering a shadow for the shadow casting element comprises testing positions of pixels against the shadow position, and
wherein rendering a shadow for the shadow casting element comprises rendering a soft shadow in a single-pass operation; and
attaching a script to the shadowed element that passes information to a shader for dynamic updating of the rendered shadow
attaching a script to the shadowed element that passes information to a shader for dynamic updating of the rendered shadow;
dynamically updating the rendered shadow using the attached script.

18. The one or more computer storage devices of claim 17 wherein the operations further comprise:
obtaining a position of the shadowed element; and
based at least on the position of the shadow casting element and the position of the shadowed element, determining the distance between the shadow casting element and the shadowed element and the relative direction between the shadow casting element and the shadowed element.

19. The one or more computer storage devices of claim 17 wherein rendering a shadow for the shadow casting element comprises testing positions of pixels against the shadow position.

20. The one or more computer storage devices of claim 17 wherein the shadow casting element comprises a user interface (UI) element.

* * * * *